United States Patent
Rhee et al.

(10) Patent No.: US 12,531,286 B2
(45) Date of Patent: Jan. 20, 2026

(54) BATTERY MODULE AND BATTERY PACK

(71) Applicant: SK On Co., Ltd., Seoul (KR)

(72) Inventors: Seo Roh Rhee, Daejeon (KR); Ji Eun Kang, Daejeon (KR); Da Som Park, Daejeon (KR); Jeong Woo Han, Daejeon (KR)

(73) Assignee: SK On Co., Ltd., Seoul (KR)

( * ) Notice: Subject to any disclaimer, the term of this patent is extended or adjusted under 35 U.S.C. 154(b) by 684 days.

(21) Appl. No.: 17/851,207

(22) Filed: Jun. 28, 2022

(65) Prior Publication Data
US 2022/0416320 A1  Dec. 29, 2022

(30) Foreign Application Priority Data
Jun. 28, 2021  (KR) .................. 10-2021-0083975

(51) Int. Cl.
*H01M 10/48*  (2006.01)
*H01M 50/186*  (2021.01)
*H01M 50/503*  (2021.01)
*H01M 50/507*  (2021.01)
*H01M 50/516*  (2021.01)

(52) U.S. Cl.
CPC ....... *H01M 10/482* (2013.01); *H01M 50/186* (2021.01); *H01M 50/503* (2021.01); *H01M 50/507* (2021.01); *H01M 50/516* (2021.01)

(58) Field of Classification Search
CPC ............. H01M 10/482; H01M 10/186; H01M 50/516; H01M 50/503; H01M 50/507
See application file for complete search history.

(56) References Cited

U.S. PATENT DOCUMENTS

| | | | |
|---|---|---|---|
| 11,139,543 B2 | 10/2021 | Yoo et al. | |
| 2011/0104527 A1 | 5/2011 | Choi et al. | |
| 2013/0323549 A1* | 12/2013 | Choi | H01M 50/507 |
| | | | 429/62 |

(Continued)

FOREIGN PATENT DOCUMENTS

| | | |
|---|---|---|
| EP | 2698847 A1 | 2/2014 |
| KR | 10-2009-0064041 A | 6/2009 |

(Continued)

OTHER PUBLICATIONS

Extended European Search Report for the European Patent Application No. 22181666.3 issued by the European Patent Office on Dec. 5, 2022.

(Continued)

*Primary Examiner* — Nicholas A Smith
*Assistant Examiner* — Benjamin Eli Kass-Mullet
(74) *Attorney, Agent, or Firm* — IP & T GROUP LLP

(57) ABSTRACT

A battery module includes a case, a plurality of battery cells accommodated in the case, and a first busbar connecting at least one of the plurality of battery cells to a conductive connector, wherein the first busbar includes a first connection portion connected to the at least one battery cell, a second connection portion connected to the conductive connector, and a first linking portion connecting the first connection portion and the second connection portion to each other, wherein the first linking portion includes a material having a melting point lower than that of the first connection portion or the second connection portion.

11 Claims, 6 Drawing Sheets

(56) References Cited

U.S. PATENT DOCUMENTS

| | | | |
|---|---|---|---|
| 2015/0037650 A1* | 2/2015 | Lee | H01M 50/211 |
| | | | 429/154 |
| 2018/0108506 A1* | 4/2018 | Doering | H01H 85/12 |
| 2018/0205053 A1* | 7/2018 | Ryu | H01M 50/211 |
| 2020/0112012 A1 | 4/2020 | Fernandez-Galindo et al. | |
| 2020/0168887 A1* | 5/2020 | Yoo | H01M 50/581 |
| 2022/0393299 A1* | 12/2022 | Ryu | H01M 50/30 |

FOREIGN PATENT DOCUMENTS

| | | |
|---|---|---|
| KR | 10-2013-0064091 A | 6/2013 |
| KR | 10-2013-0080023 A | 7/2013 |
| KR | 10-2015-0121518 A | 10/2015 |
| KR | 10-2016-0040167 A | 4/2016 |
| KR | 10-2016-0068722 A | 6/2016 |
| KR | 10-2017-0140694 A | 12/2017 |
| KR | 10-2019-0096674 A | 8/2019 |
| KR | 10-2020-0143939 A | 12/2020 |

OTHER PUBLICATIONS

Office Action for Korean Patent Application No. 10-2021-0083975 issued by the Korean Patent Office on Jun. 9, 2025.

* cited by examiner

BATTERY MODULE AND BATTERY PACK

CROSS-REFERENCE TO RELATED APPLICATION(S)

This application claims benefit of priority to Korean Patent Application No. 10-2021-0083975 filed on Jun. 28, 2021 in the Korean Intellectual Property Office, the disclosure of which is incorporated herein by reference in its entirety.

BACKGROUND

1. Field

The present disclosure relates to a battery module and a battery pack.

2. Description of Related Art

Recently, battery packs that may be charged and discharged have been widely used as an energy source for wireless mobile devices and have come to prominence as a power source of electric vehicles (EVs), hybrid electric vehicles (HEVs), and electric bicycles (eBikes), as these vehicles are considered to be a solution to air pollution from existing gasoline and diesel vehicles that use fossil fuels.

In addition, a lithium secondary battery is mainly used as a power source for an electric vehicle or a hybrid vehicle. Since a large amount of power for an operation such as motor driving is required, high-capacity battery modules configured by connecting battery modules, in which a plurality of high-power battery cells are electrically connected, in series or parallel, have generally been used.

Compared to small mobile devices in which one, two or three battery cells per device are used, medium to large devices, such as electric vehicles and electric bicycles, require higher power and higher capacity. For these vehicles, a plurality of high-power battery cells are primarily electrically connected to each other to configure a battery module which will meet the required specification for a high-power, high-capacity battery pack.

Meanwhile, when a decomposition reaction continues in abnormal operating conditions (such as for example overcharging, overdischarging, high temperature exposure, an electrical short circuit, etc.), heat and gas may occur inside such a secondary battery, and acceleration of the decomposition reaction under high temperature and high pressure conditions may cause a fire or explosion.

In particular, this problem may cause a serious large-scale accident in the case where a high-power, high-capacity battery pack having a plurality of battery cells is used. When thermal runaway occurs in a specific battery module, a thermally conductive material may be discharged to the outside of the module, which may break an insulation state between the battery module and a neighboring battery module. In this case, a very high current may instantaneously flow between the battery modules, causing thermal runaway in a neighboring battery module, which may lead to a fire in the entire battery pack.

SUMMARY

Embodiments of the present invention provide a battery module and battery pack for a secondary battery having improved safety and reliability by preventing an event, such as an explosion and thermal runaway, occurring in the battery module from propagating to other battery modules and further to the entire battery pack.

Specifically, embodiments provide a cut-off unit or an electrical disconnector for cutting off an electrical connection between a specific battery module and a neighboring structure (e.g., another battery module) when an event, such as thermal runaway, occurs in the corresponding battery module.

According to one aspect of the present disclosure, a battery module includes: a case; a plurality of battery cells accommodated in the case; and a first busbar connecting at least one of the plurality of battery cells to a conductive connector, wherein the first busbar includes a first connection portion connected to the at least one battery cell, a second connection portion connected to the conductive connector, and a first linking portion connecting the first connection portion and the second connection portion to each other, wherein the first linking portion includes a material having a melting point lower than that of the first connection portion or the second connection portion.

The first connection portion may be disposed inside the case, the second connection portion may be exposed to the outside of the case, and wherein the conductive connector may be disposed outside the case.

The first connection portion or the second connection portion may include copper, and the first linking portion may include aluminum.

The first linking portion may include a first portion forming a boundary with the first connection portion, a second portion forming a boundary with the second connection portion, and a third portion connecting the first portion and the second portion to each other, wherein the first portion and the third portion may include a material having a melting point lower than that of the first connection portion or the second connection portion, and the second portion may include the same material as that of the first connection portion or the second connection portion.

The first linking portion may include a first portion forming a boundary with the first connection portion, a second portion forming a boundary with the second connection portion, and a third portion connecting the first portion and the second portion to each other, and the first portion may include a material having a melting point lower than that of the first connection portion.

The first linking portion may include a first portion forming a boundary with the first connection portion, a second portion forming a boundary with the second connection portion, and a third portion connecting the first portion and the second portion to each other, and the second portion may include a material having a melting point lower than that of the second connection portion.

The first linking portion may include a first portion forming a boundary with the first connection portion, a second portion forming a boundary with the second connection portion, and a third portion connecting the first portion and the second portion to each other, wherein the first portion may include a material having a melting point lower than that of the first connection portion, the second portion may include a material having a melting point lower than that of the second connection portion, and the third portion may include a material having the same melting point as that of the first connection portion or the second connection portion.

The at least one battery cell may include a pouch type casing and an electrode assembly accommodated in the casing, a sealing portion formed on an edge of the casing may include a weak portion having a sealing strength weaker than that of other portions, and the first linking portion may be disposed to face the weak portion.

The first linking portion may be coupled to the first connection portion or the second connection portion by welding.

The battery module may further include: a first battery cell group including at least a first battery cell among the plurality of battery cells; a second battery cell group adjacent to the first battery cell group and including at least a second battery cell among the plurality of battery cells; an a second busbar electrically connecting the first battery cell group to the second battery cell group, wherein the second busbar may include a third connection portion connected to a positive electrode of the first battery cell group; a fourth connection portion connected to a negative electrode of the second battery cell group, and a second linking portion connecting the third connection portion and the fourth connection portion to each other.

The second linking portion may include a material having a melting point lower than that of the third connection portion or the fourth connection portion.

The second linking portion may include aluminum, and the third connection portion or the fourth connection portion may include copper.

According to another aspect of the present disclosure, a battery pack includes: a pack case; battery modules disposed inside the pack case; and an intermodule busbar electrically connecting the battery modules to each other, wherein at least one of the battery modules includes: a plurality of battery cells; and a battery module busbar in the at least one of the battery modules electrically connecting at least one of the plurality of battery cells to the intermodule busbar, wherein the battery module busbar includes a first connection portion connected to the at least one battery cell, a second connection portion connected to the intermodule busbar, and a first linking portion connecting the first connection portion and the second connection portion to each other, wherein the first connection portion or the second connection portion may include a first material, and the first linking portion may include a second material having a melting point lower than that of the first material.

The intermodule busbar may include the first material in a portion in contact with at least the second connection portion.

The plurality of battery cells may form a first battery cell group and a second battery cell group adjacent to each other, and the battery module busbar may include a first busbar connected to the at least one battery cell and the intermodule busbar; and a second busbar connected to the battery cell of the first battery cell group and the battery cell of the second battery cell group.

The first linking portion may be coupled to the first connection portion or the second connection portion by welding.

The first linking portion may include a first portion forming a boundary with the first connection portion, a second portion forming a boundary with the second connection portion, and a third portion connecting the first portion and the second portion to each other, and the first portion may include a material having a melting point lower than that of the first connection portion.

The first linking portion may include a first portion forming a boundary with the first connection portion, a second portion forming a boundary with the second connection portion, and a third portion connecting the first portion and the second portion to each other, and the second portion may include a material having a melting point lower than that of the second connection portion.

The first linking portion may include a first portion forming a boundary with the first connection portion, a second portion forming a boundary with the second connection portion, and a third portion connecting the first portion and the second portion to each other, wherein the first portion may include a material having a melting point lower than that of the first connection portion, the second portion may include a material having a melting point lower than that of the second connection portion, and the third portion may include a material having the same melting point as that of the first connection portion or the second connection portion.

According to another aspect of the present disclosure, a bus bar for connecting a plurality of battery modules together, comprising: an intermodule bus bar connecting a first battery module of the plurality of battery modules to a second battery module of the plurality of battery modules; and a first bus bar comprising multiple materials including at least one material having a lower melting point than other of the multiple materials, the first bus bar connecting at least one battery cell of the first battery module or the second battery module to the intermodule bus bar, wherein melting of the at least one material disconnects an electrical connection between the first battery module and the second battery module.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
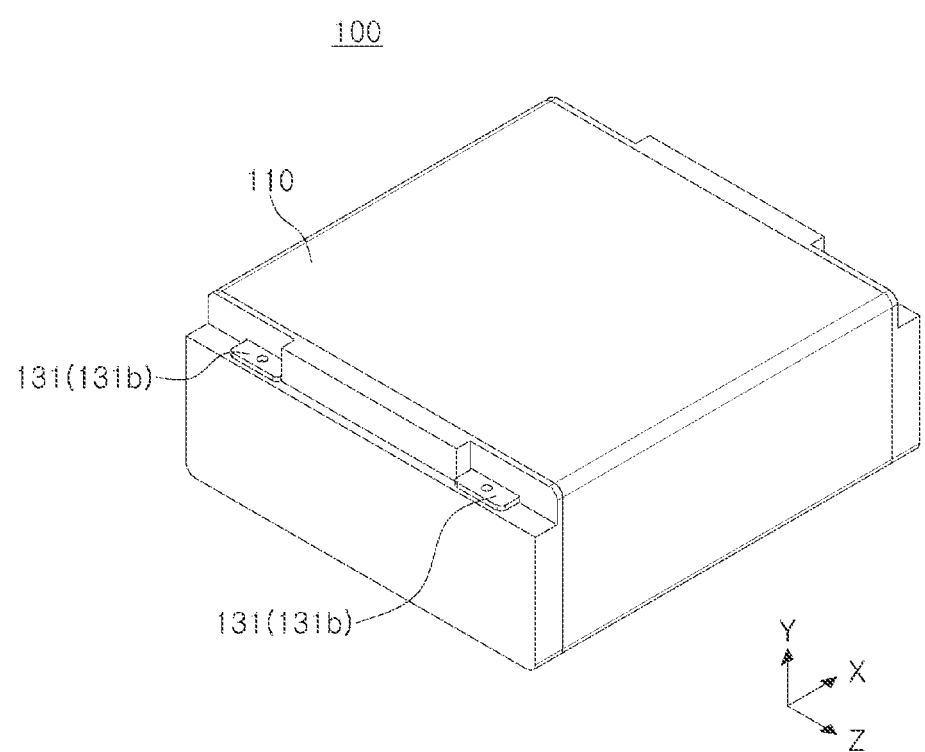
FIG. 1 is a perspective view of a battery module according to one embodiment of the present invention.

The terms used in this document are selected to include general terms consideration of functions in various embodiments. However, these terms may vary according to intentions of persons skilled in the art or legal or technical interpretations and appearance of new technologies. In certain cases, a term may be one that was arbitrarily established by the applicant. Such terms may be interpreted as having meanings defined in this disclosure. If a term is not specifically defined, it may be interpreted on the basis of general contents of this disclosure and general technical common meaning in the art.

Throughout the specification, the like reference numerals denote the substantially same elements. For the purposes of description and understanding, the same reference numerals or symbols will be used in different embodiments and described. That is, although all the components are illustrated with the same reference numerals in a plurality of drawings, the plurality of drawings do not signify a single embodiment.

In this disclosure and claims, the ordinal terms first, second, etc. may be used to distinguish elements from each other. These ordinal terms are only used to distinguish the same or similar elements from another, and meanings of terms should not be limited in interpretation due to the use of the ordinal terms. For example, elements combined with such ordinal terms should not be limited in usage order or disposition order by the number. If necessary, each ordinal numbers may be replaced to be used.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Embodiments of the present disclosure will now be described in detail with reference to the accompanying drawings. However, the present invention is not limited to the details shown in the present disclosure provided as merely illustrative of the present invention.

For example, those skilled in the art who understand the present disclosure would recognize other embodiments to be within the scope of the present disclosure through addition, change, deletion, and the like, and those other embodiments will also be within the scope of the present disclosure.

Figure 2:
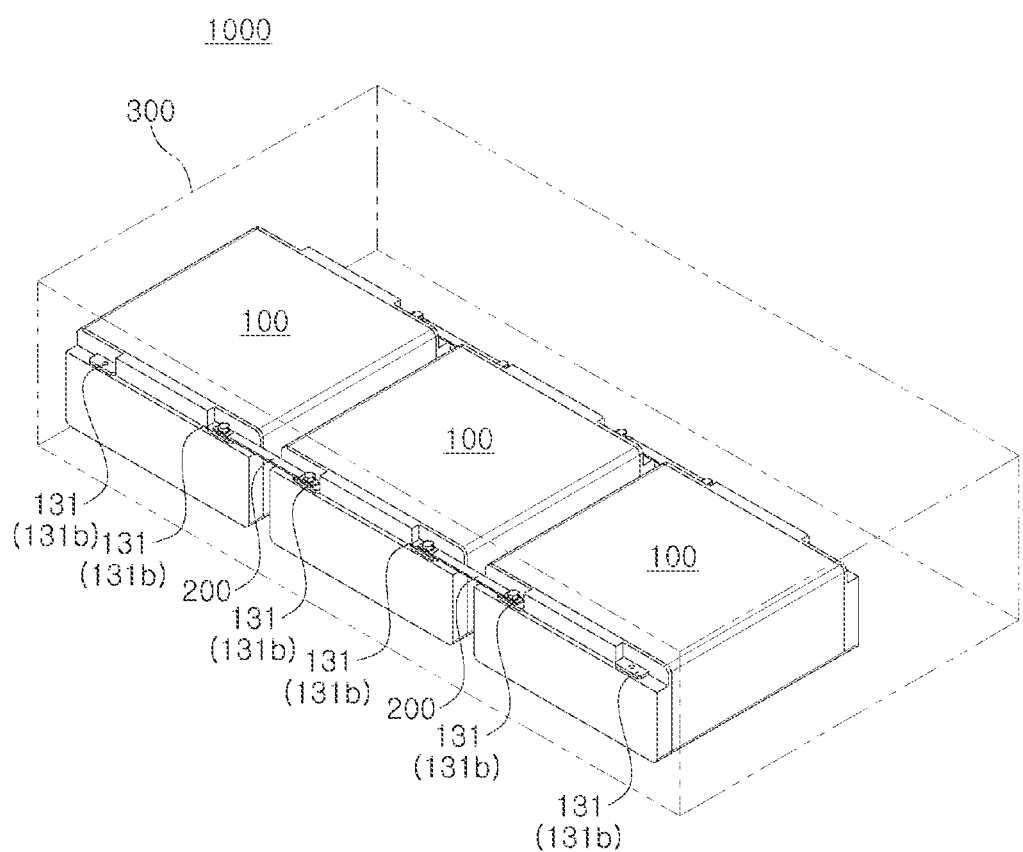
FIG. 2 is a schematic diagram of a battery pack accommodating several battery modules in another embodiment of the present invention.
Figure 3:
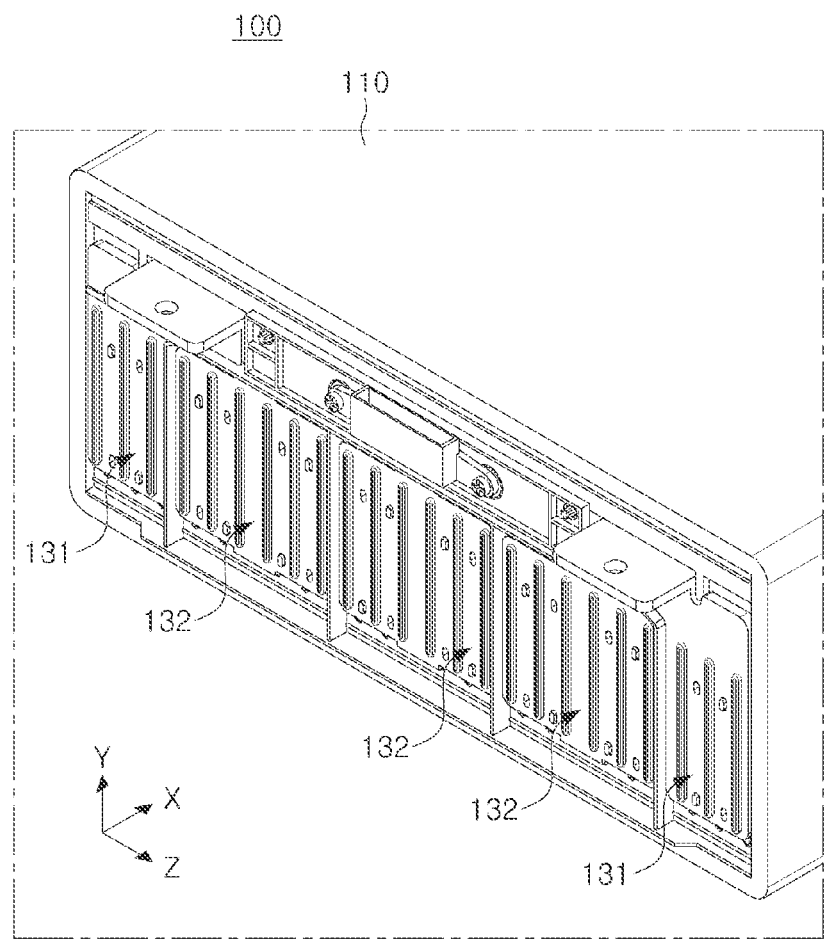
FIG. 3 illustrates busbars of a battery module according no still another embodiment of the present invention.
Figure 4:
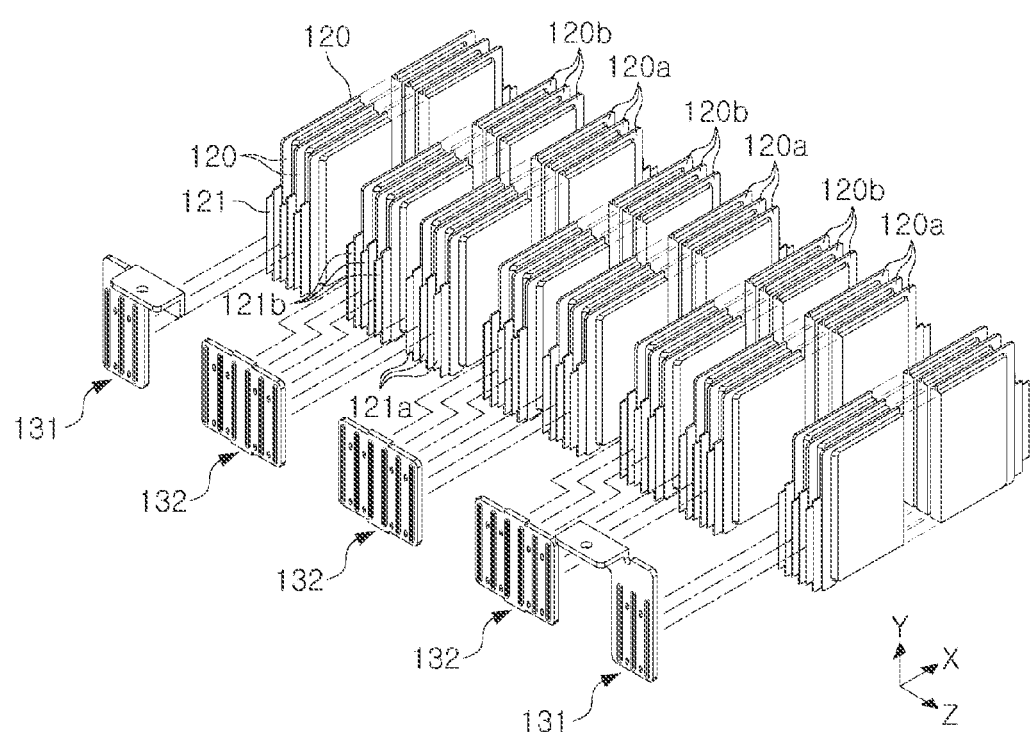
FIG. 4 illustrates a connection relationship between battery cells and busbars according to yet another embodiment of the present invention.

FIG. 1 is a perspective view of a battery module 100 according to one embodiment. FIG. 2 schematically illustrates a battery pack 1000 accommodating several battery modules 100 in another embodiment. FIG. 3 illustrates busbars 131 and 132 of the battery module 100 in still another embodiment. FIG. 4 illustrates a connection relationship between battery cells 120 and the busbars 131 and 132 according to yet another embodiment.

Referring to FIG. 1, the battery module 100 may include battery cells 120 (shown in FIG. 4) disposed inside a case 110, and may include the busbar 131 electrically connected to the battery cells 120 and partially exposed to the outside of the case 110. Referring to FIG. 2, a plurality of battery modules 100 are disposed inside a pack case 300, and the battery modules 100 are electrically connected through an intermodule busbar 200. That is, one end of the intermodule busbar 200 is connected to the busbar 131 of any one battery module 100, and the other end thereof is connected to the busbar 131 of another battery module 100. The intermodule busbar 200 illustrated in FIG. 2 has a bar shape, but this is only an example, and in other embodiments, the intermodule busbar 200 may have various shapes.

FIG. 3 is a view in which a portion of the case 110 is omitted in the battery module 100, and shows the busbars 131 and 132 connected to the battery cells 120. Referring to FIG. 4, the battery cell 120 is connected to the busbars 131 and 132 through an electrode lead 121.

In an embodiment, the battery module 100 includes a first busbar 131 connecting the battery module 100 to an external device (e.g., another battery module) and/or a second busbar 132 for electrical connection between the battery cells 120 inside the battery module 100.

Referring to FIG. 4, three battery cells disposed on the leftmost side (−Z direction) and three battery cells disposed on the rightmost side (+Z direction) are connected to the first busbar 131. A portion (e.g., 131b in FIG. 1) of the first busbar 131 is exposed to the outside of the case 110 and connected to a conductive connector (e.g., the intermodule busbar 200) disposed outside the case 110.

The second busbar 132 connects the first battery cell group 120a and the second battery cell group 120b to each other. The second busbar 132 electrically connects to a first electrode lead 121a of a first battery cell group 120a and electrically connects to a second electrode lead 121b of a second battery cell group 120b. The first electrode lead 121a and the second electrode lead 121b have different polarities. For example, the first electrode lead 121a may be a positive electrode lead and the second electrode lead 121b may be a negative electrode lead.

Figure 5:
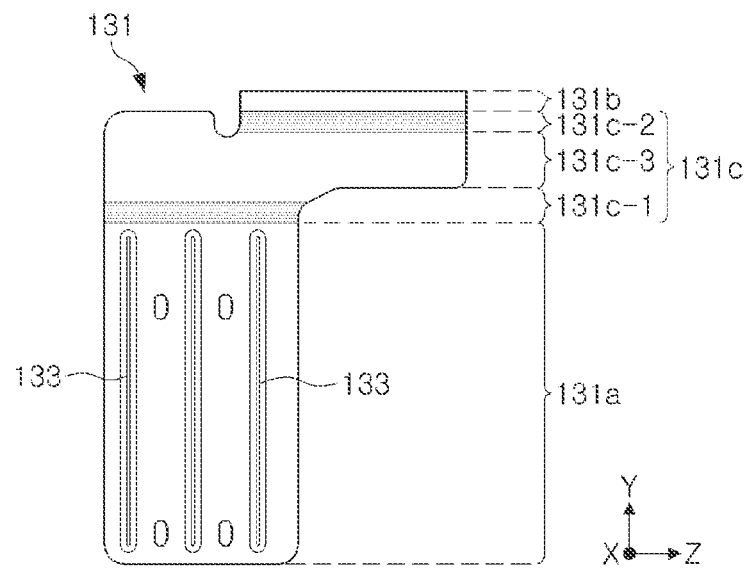
FIG. 5 illustrates a busbar including a terminal unit according to one embodiment of the present invention.
Figure 6:
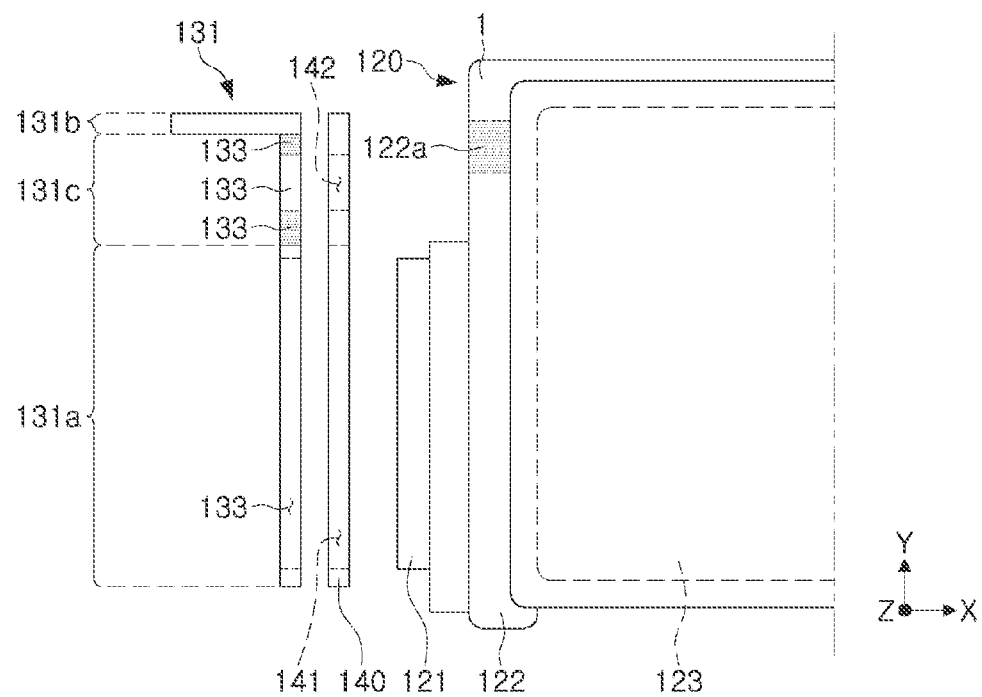
FIG. 6 is diagram illustrating a positional relationship between a melting portion of a busbar and a sealing portion of a battery cell according to another embodiment of the present invention.

FIG. 5 illustrates a busbar including a connection portion exposed to the outside according to one embodiment. FIG. 6 illustrates a positional relationship between a busbar and the battery cell 120 according to another embodiment.

Referring to FIGS. 5 and 6, in one embodiment, the first busbar 131 may include a first connection portion 131a connected to the battery cell 120 and a second connection portion 131b exposed to the outside of the case 110. The electrode lead 121 of the battery cell 120 is connected to a slit 133 of the first connection portion 131a. The first connection portion 131a may include as many slits 133 as the number of connected battery cells 120.

The first busbar 131 may include a first linking portion 131c connecting the first connection portion 131a and the second connection portion 131b. Referring to FIG. 1 or 2 together, the second connection portion 131b is bent and extends in a −X direction from an end portion of the first linking portion 131c to be exposed to the outside of the case 110, and is connected to the intermodule busbar 200 electrically connecting adjacent battery modules 100.

In another embodiment, the first linking portion 131c may include a material, different from that of the first connection portion 131a or the second connection portion 131b. In one embodiment, the first linking portion 131c may include a material having a melting point lower than that of the first connection portion 131a or the second connection portion 131b. For example, the first connection portion 131a and the second connection portion 131b may include copper, and the first linking portion 131c may include aluminum. As another example, the second connection portion 131b may include copper, and the first connection portion 131a and the first linking portion 131c may include aluminum. As another example, the first connection portion 131a may include copper, and the second connection portion 131b and the first linking portion 131c may include aluminum.

In one embodiment, the first busbar 131 provides an electrical path between the first connection portion 131a and the second connection portion 131b. One end of the electrical path is connected to the first connection portion 131a, the other end thereof is connected to the second connection portion 131b, and the first linking portion 131c is responsible for the path between both ends.

In still another embodiment, while current flows from the first connection portion 131a to the second connection portion 131b, the current passes through at least a partial section formed of a material having a melting point lower than that of other sections. In yet another embodiment, the electrical path may include a first section connected to the first connection portion 131a, a second section connected to the second connection portion 131b, and a third section between the first section and the second section, and a portion of the first busbar 131 corresponding to the third section may include a material having a melting point lower than that of a portion corresponding to the first section or the second section.

For example, the first section and the second section may include copper, and the third section may include aluminum. As another example, the second section may include copper, and the first section and the third section may include aluminum. As another example, the first section may include copper, and the second section and the third section may include aluminum. While illustrated here as copper and aluminum, alloys of these materials may the used, especially alloys of aluminum where the melting point may be varied to be lower or higher depending on the alloy.

When thermal runaway occurs inside the battery module 100, high-temperature gas, flame, or the like in the battery cell 120 is elected into and out of the case 110. Because the first linking portion 131c has a melting point lower than that of other portions (e.g., the first connection portion 131a and/or the second connection portion 131b), the first linking portion 131c may be melted and cut faster, and thus, an electrical connection between the first connection portion 131a and the second connection portion 131b may be cut off at an early stage.

The flame or gas ejected from the battery module 100 in which thermal runaway has occurred may include conductive particles, and these conductive particles may have a fatal effect on other battery modules constituting a battery pack (e.g., the battery pack 1000 of FIG. 2), as well as the battery module 100 in which thermal runaway has occurred. For example, the conductive particles may break an insulation state between the battery cell 120 and the case 110 or an insulation state between the battery module 100 and the pack case 300, which may lead to a fire in the entire battery pack 1000. According to one embodiment, in an event situation such as thermal runaway, the first linking portion 131c may be melted and cut relatively quickly to quickly block an electrical path between the battery modules 100 and suppress the propagation of thermal runaway.

In one embodiment, the first linking portion 131c may be formed of two or more types of materials. In one embodiment, the first linking portion 131c may be divided into a first portion 131c-1 forming a boundary with the first connection portion 131a, a second portion 131c-2 forming a boundary with the second connection portion 131b, and a third portion 131c-3 connecting the first portion 131c-1 and the second portion 131c-2, and each portion may include a material, different from that of adjacent portions.

In an embodiment, the first portion 131c-1 and the second portion 131c-2 may include a material having a melting point lower than that of the first connection portion 131a or the second connection portion 131b, and the third portion 131c-3 may include the same material as that of the first connection portion 131a or the second connection portion 131b. For example, the first connection portion 131a, the second connection portion 131b, and the third portion 131c-3 may include copper, and the first portion 131c-1 and the second portion 131c-2 may include aluminum.

Meanwhile, a material constituting the first linking portion 131c may be more easily melted and cut than the first connection portion 131a or the second connection portion 131b in a thermal runaway situation, and thereby an electrical connection between the first connection portion 131a and the second connection portion 131b can be rapidly cutoff. While the present disclosure is not limited to the example illustrated in FIG. 5, in FIG. 5, the third portion 131c-3 is illustrated to include a material, different from that of the first portion 131c-1 or the second portion 131c-2, but this is only an example, the third portion 131c-3 may also be formed of the same material as the first portion 131c-1 or the second portion 131c-2.

Referring to FIG. 2, the second connection portion 131b may contact the intermodule busbar 200. If the materials of the second connection portion 131b and the intermodule busbar 200 are different from each other, loss may occur due to contact resistance. Therefore, it is advantageous for the intermodule busbar 200 and the second connection portion 131b to be formed of the same material at least in the portions in contact with each other in order to reduce loss due to contact resistance. Accordingly, in one embodiment, the second connection portion 131b and the intermodule busbar 200 may include copper, and the first linking portion 131c may include aluminum.

In another embodiment, the first busbar 131 may be made by friction stir welding of two members of different materials. For example, the first connection portion 131a formed of copper, the second connection portion 131b, and the first linking portion 131c formed of aluminum may be coupled to each other in a friction stir welding method to form an integral first busbar 131.

Meanwhile, the first busbar 131 is not limited to the form illustrated in FIG. 5, and may be provided in various forms to electrically connect the battery cell 120 and other components outside the battery module 100 (e.g., another battery module 100).

Referring to FIG. 6, the battery cell 120 includes an electrode assembly 123 and a casing surrounding the electrode assembly 123. The battery cell 120 includes a sealing portion 122 at the edge of the casing. For example, the sealing portion 122 is a portion in which two sheets surrounding both sides of the electrode assembly 123 are joined to each other at the edges. Sealing portion 122 seals the inside of the casing from the outside. As another example, the casing may be provided in a form in which one sheet is folded to surround the electrode assembly 123.

In another embodiment, the first linking portion 131c may be disposed in a position corresponding to the sealing portion 122 of the battery cell 120. When a gas or flame occurs due no a short circuit inside the electrode assembly 123, the pressure inside the casing may increase and the flame or gas may be elected to the outside of the casing through the sealing portion 122. The flame or gas may be ejected to the outside of the battery cell 120 through a portion of the sealing portion 122, and the first linking portion 131c may be melted and cut to cut off the connection between the first connection portion 131a and the second connection portion 131b.

In another embodiment, the sealing portion 122 may include a weak portion 122a having weak sealing strength. Since a flame or gas is ejected from a portion having weak sealing strength, when the weak portion 122a and the first linking portion 131c are disposed in positions corresponding to each other, an electrical connection between the first connection portion 131a and the second connection portion 131b in a thermal runaway situation may be effectively cut. This is because, when the first linking portion 131c is positioned close to the weak portion 122a, the first linking portion 131c may be melted relatively quickly. For example, referring to FIG. 6, the weak portion 122a and the first linking portion 131c may be disposed to face each other in the X direction.

Meanwhile, the weak portion 122a is not an essential component in the battery module 100, and the weak portion 122a may be omitted in FIG. 6. When thermal runaway occurs, the temperature inside the case 110 becomes very high, and thus, the first linking portion 131c may be melted to cut the first busbar 131, even without a structure for separately guiding a flame or gas toward the first linking portion 131c.

In another embodiment, an insulating member 140 may be further disposed between the first busbar 131 and the battery cell 120. The electrode lead 121 may be connected to the first connection portion 131a through a hole 141 of the insulating member 140. In one embodiment, the insulating member 120 may include a gas guiding portion 142 positioned at a portion facing the first linking portion 131c and connecting both sides of the insulating member 140. When a gas or flame is ejected from the battery cell 120 disposed on one side of the insulating member 140, the gas or flame may quickly reach the first linking portion 131c through the gas guiding portion 142 of the insulating member, and quickly melt and cut the first connection portion 131c. That is, by providing the gas guiding portion 142 in the insulating member 140, the electrical connection between the battery modules 100 may be quickly cut off in a thermal runaway situation. However, the gas guiding portion 142 is not an essential component of the present disclosure. When the insulating member 140 is formed of a material (e.g., plastic) having a relatively low melting point or when a thickness of the insulating member 140 is relatively thin, the insulating member 140 may be easily removed at the initial stage in a thermal runaway situation, and accordingly, the insulating member 140 does not interfere with a flame or gas ejected from the battery cell 120 from contacting the first linking portion 131c.

Figure 7:
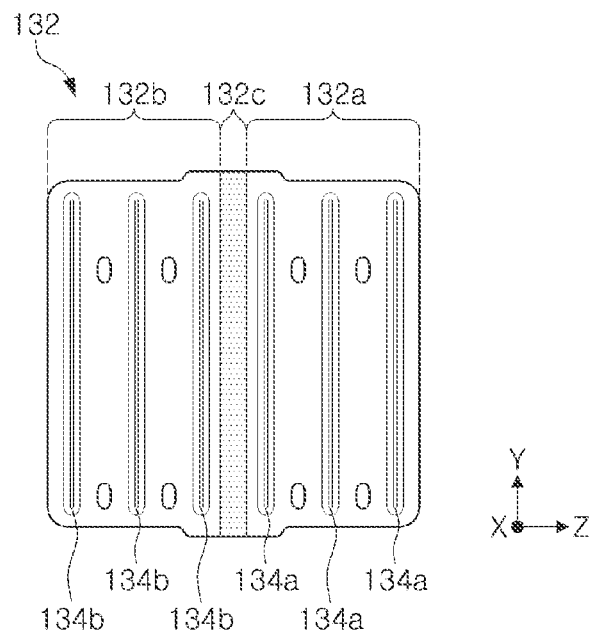
FIG. 7 is a view illustrating a melting portion of a busbar in a first embodiment of the present invention.
Figure 8:
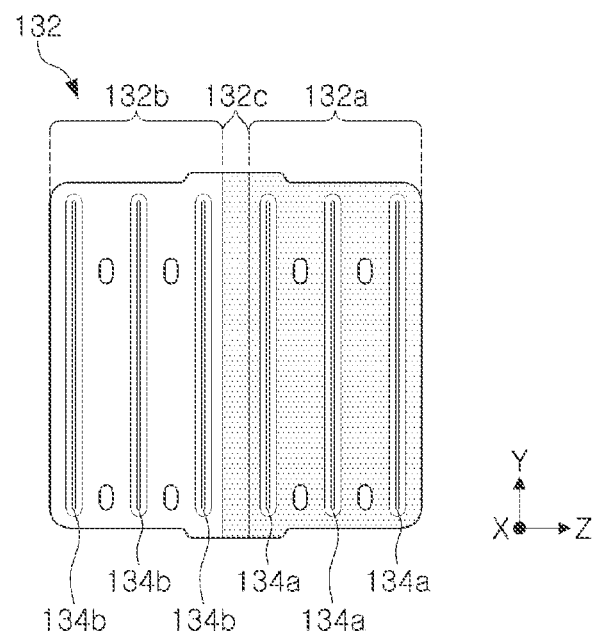
FIG. 8 is a view illustrating a melting portion of a busbar in a second embodiment of the present invention.

FIG. 7 illustrates the second busbar 132 in the first embodiment. FIG. 8 illustrates the second busbar 132 in the second embodiment. The second busbar 132 will be described with reference to FIGS. 7 and 8 together with FIG. 4.

Referring to FIG. 4, in one embodiment, the second busbar 132 is configured to connect the first battery cell group 120a and the second battery cell group 120b disposed inside the case 110. The first battery cell group 120a and the second battery cell group 120b are adjacent to each other and may include at least one battery cell 120. In the illustrated embodiment, the first battery cell group 120a and the second battery cell group 120b may include three battery cells 120, but this is only an example, and two or less or four or more battery cells 120 may constitute the first battery cell group 120a or the second battery cell group 120b.

In another embodiment, the second busbar 132 electrically connects a positive electrode of the first battery cell group 120a and a negative electrode of the second battery cell group 120b. Alternatively, the second busbar 132 electrically connects a negative electrode of the first battery cell group 120a and a positive electrode of the second battery cell group 120b. For example, the second busbar 132 electrically connects the first electrode lead 121a of the first battery cell group 120a and the second electrode lead 121b of the second battery cell group 120b to each other, and, in this case, the first electrode lead 121a and the second electrode lead 121b have different polarities. For example, the first electrode lead 121a may be a positive electrode of the first battery cell group 120a, and the second electrode lead 121b may be a negative electrode of the second battery cell group 120b.

Referring to FIGS. 7 and 8, the second busbar 132 includes a third connection portion 132a connected to the first battery cell group 120a and a fourth connection portion 132b connected to the second battery cell group 120b. For example, a positive lead of the first battery cell group 120a may be connected to a first slit 134a of the third connection portion 132a, and a negative lead of the second battery cell group 120b may be connected to a second slit 134b of the fourth connection portion 132b. That is, the third connection portion 132a and the fourth connection portion 132b have different polarities.

In the illustrated embodiment, three battery cells 120 are connected to the third connection portion 132a and three battery cells 120 are connected to the fourth connection portion 132b, but this is only an example, and one, two, or four or more battery cells 120 may be connected to the third connection portion 132a or the fourth connection portion 132b in other embodiments.

In another embodiment, the second busbar 132 includes a second linking portion 132c connecting the third connection portion 132a and the fourth connection portion 132b. In one embodiment, the second linking portion 132c may include a material, different from that of the third connection portion 132a or the fourth connection portion. In one embodiment, the second linking portion 132c may include a material having a melting point dower than that of the third connection portion 132a or the fourth connection portion 132b.

For example, referring to FIG. 7, the third connection portion 132a and the fourth connection portion 132b may include copper, and the second linking portion 132c may include aluminum. As another example, referring to FIG. 8, the fourth connection portion 132b may include copper, and the third connection portion 132a and the second linking portion 132c may include aluminum. In another example, the third connection portion 132a may include copper, and the fourth connection portion 132b and the second linking portion 132c may include aluminum.

When a flame or gas is ejected to the outside of the battery cell 120 due to an abnormal action of the battery cell 120, the second linking portion 132c may be melted and cut more quickly than other portions, thereby effectively cutting off an electrical connection between the first battery cell group 120a and the second battery cell groups 120b.

The case 110 of the battery module 100 includes conductive material, and for insulation between the second busbar 132 and the case 110, the second busbar 132 and the case 110 are spaced apart from each other by a distance sufficient to maintain insulation therebetween. However, the gas ejected from the battery cell 120 to the outside may include conductive particles, which may reduce the insulation distance between the second busbar 132 and the case 110 to break the insulation state therebetween. If the connection between the third connection portion 132a and the fourth connection portion 132b is maintained even in a fire situation, damage due to excessive current may spread even to another external battery module 100, as well as to the internal battery cells 120 of the case 110.

According to one embodiment, the second busbar 132 includes the second linking portion 132c that may be melted relatively quickly by a flame or a high-temperature gas, and the second linking portion 132c may be melted in a thermal runaway situation so that an electrical path provided by the second busbar 132 may be quickly cut. This may prevent the fire from propagating to other battery cells 120 or other battery modules 100.

In another embodiment, the second busbar 132 may be formed by welding two members of different materials. For example, the third connection portion 132a formed of copper, the fourth connection portion 132b, and the second linking portion 132c formed of aluminum may be coupled in a manner of friction stir welding, rotational friction welding, laser welding, ultrasonic welding, etc. to form the integral second busbar 132.

Meanwhile, the second busbar 132 is not limited to the form illustrated in FIGS. 7 and 8, and may be provided in various forms to electrically connect the battery cells 120.

According to one embodiment of the present document, by preventing an event, such as an explosion and thermal runaway, occurring in a battery module from propagating to other battery modules and further to the entire battery pack, battery module and battery pack for a secondary battery having improved safety and reliability may be provided.

The battery module according to another embodiment may provide a cut-off unit or an electrical disconnector for cutting off an electrical connection between a specific battery module and a neighboring structure (e.g., another battery module) when an event, such as thermal runaway, occurs in the corresponding battery module. In one aspect of the present disclosure, a bus bar (as shown in FIG. 2) connects a plurality of battery modules together. This bus bar can include a) an intermodule bus bar which connects a first battery module of the plurality of battery modules to a second battery module of the plurality of battery modules and b) a first bus bar is in series with the intermodule bus bar and comprises multiple materials including at least one material having a lower melting point than other of the multiple materials, and the first bus bar connecting at least one battery cell of the first battery module or the second battery module to the intermodule bus bar, wherein melting of the at least one material disconnects an electrical connection between the first battery module and the second battery module.

While various embodiments have been illustrated and described above, it will be apparent to those skilled in the art that modifications and variations could be made without departing from the scope of the present disclosure as defined by the appended claims.

What is claimed is:

1. A battery module comprising:
a case;
a plurality of battery cells accommodated in the case;
a first busbar connecting at least one of the plurality of battery cells to a conductive connector; and
a second busbar connecting a first battery cell group including at least a first battery cell among the plurality of battery cells to a second battery cell group including a second battery cell among the plurality of battery cells, and
wherein the first busbar includes a first connection portion connected to the at least one battery cell, a second connection portion connected to the conductive connector, and a first linking portion connecting the first connection portion and the second connection portion to each other,
wherein the first linking portion includes a material having a melting point lower than that of the first connection portion or the second connection portion, and
wherein the at least one battery cell includes a pouch type casing and an electrode assembly accommodated in the casing,
the casing comprises:
a sealing portion formed on an edge of the casing and includes a weak portion having a sealing strength weaker than that of other portions; and
the first linking portion is disposed to face and overlap the weak portion in a same direction.

2. The battery module of claim 1, wherein the first connection portion is disposed inside the case, the second connection portion is exposed to the outside of the case, and wherein the conductive connector disposed outside the case.

3. The battery module of claim 1, wherein the first connection portion or the second connection portion includes copper, and the first linking portion includes aluminum.

4. The battery module of claim 1, wherein
the first linking portion includes a first portion forming a boundary with the first connection portion, a second portion forming a boundary with the second connection portion, and a third portion connecting the first portion and the second portion to each other, and
the first portion and the second portion include a material having a melting point lower than that of the first connection portion or the second connection portion, and the third portion includes the same material as that of the first connection portion or the second connection portion.

5. The battery module of claim 1, wherein
the first linking portion includes a first portion forming a boundary with the first connection portion, a second portion forming a boundary with the second connection portion, and a third portion connecting the first portion and the second portion to each other, and
the second portion includes a material having a melting point lower than that of the second connection portion.

6. The battery module of claim 1, wherein
the first linking portion includes a first portion forming a boundary with the first connection portion, a second portion forming a boundary with the second connection portion, and a third portion connecting the first portion and the second portion to each other,
the first portion includes a material having a melting point lower than that of the first connection portion, the second portion includes a material having a melting point lower than that of the second connection portion, and the third portion includes a material having the same melting point as that of the first connection portion or the second connection portion.

7. The battery module of claim 1, wherein the first linking portion is coupled to the first connection portion or the second connection portion by welding.

8. The battery module of claim 1,
wherein
the second battery cell group adjacent to the first battery cell group,
wherein the second busbar electrically connects the first battery cell group to the second battery cell group, and
wherein the second busbar includes a third connection portion connected to a positive electrode of the first battery cell group, a fourth connection portion connected to a negative electrode of the second battery cell group, and a second linking portion connecting the third connection portion and the fourth connection portion to each other.

9. The battery module of claim 8, wherein the second linking portion includes a material having a melting point lower than that of the third connection portion or the fourth connection portion.

10. The battery module of claim 9, wherein the second linking portion includes aluminum, and the third connection portion or the fourth connection portion includes copper.

11. The battery module of claim 1, further comprising an insulating member disposed between the first bus bar and the at least one battery cell, wherein the insulating member includes a gas guiding portion positioned to overlap the first linking portion and the weak portion.

\* \* \* \* \*